United States Patent [19]

Kolm

[11] 3,802,200
[45] Apr. 9, 1974

[54] PLASTIC MASTER CYLINDER
[75] Inventor: Richard H. Kolm, Waukesha, Wis.
[73] Assignee: Kelsey-Hayes Company, Romulus, Mich.
[22] Filed: Mar. 27, 1972
[21] Appl. No.: 238,100

[52] U.S. Cl............................ 60/594, 60/588
[51] Int. Cl............................ F15b 7/08
[58] Field of Search........ 60/54.596 E, 54.6 R, 585, 60/588, 594; 248/15, 230

[56] References Cited
UNITED STATES PATENTS

| | | | |
|---|---|---|---|
| 3,048,980 | 8/1962 | Consino et al. | 60/594 |
| 1,985,588 | 12/1934 | Tatter | 60/594 |
| 2,389,962 | 11/1945 | Dougherty | 60/594 |
| 3,489,100 | 1/1970 | Hill | 91/391 |
| 3,123,230 | 3/1964 | Oppenheimer et al. | 60/54.6 R |
| 3,380,314 | 4/1968 | Halsted | 248/15 |
| 2,189,904 | 2/1940 | Insho | 60/54.6 R |
| 3,460,346 | 8/1969 | Branson | 60/54.6 E |
| 2,280,090 | 4/1942 | Humphreys | 248/15 |

FOREIGN PATENTS OR APPLICATIONS

| | | | |
|---|---|---|---|
| 1,120,068 | 7/1968 | Great Britain | 60/54.6 R |

Primary Examiner—Edgar W. Geoghegan
Assistant Examiner—A. M. Zupcic
Attorney, Agent, or Firm—Harness, Dickey & Pierce

[57] ABSTRACT

A corrosion resistant, hand operated, hydraulic master cylinder that is particularly adapted for use on motorcycles, bicycles or other similar vehicles. Substantially all of the parts are formed from molded plastics preferably acetal resins. A pivotally supported lever operates the brake and the pivot pin for the lever serves the additional function of holding substantially all of the components together. An improved shock resistant mounting is also incorporated for mounting the master cylinder assembly on the handlebars of the associated vehicle.

6 Claims, 5 Drawing Figures

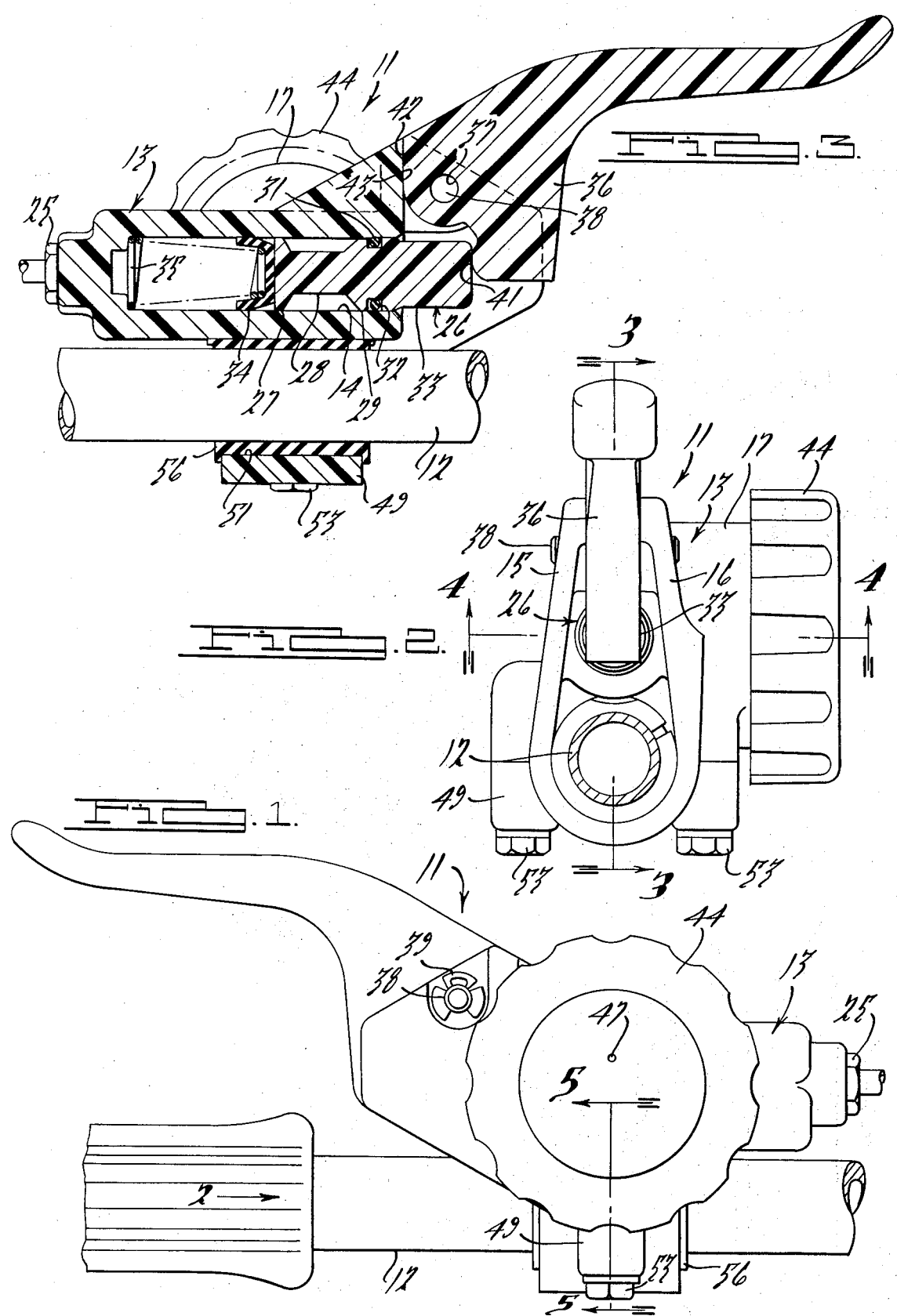

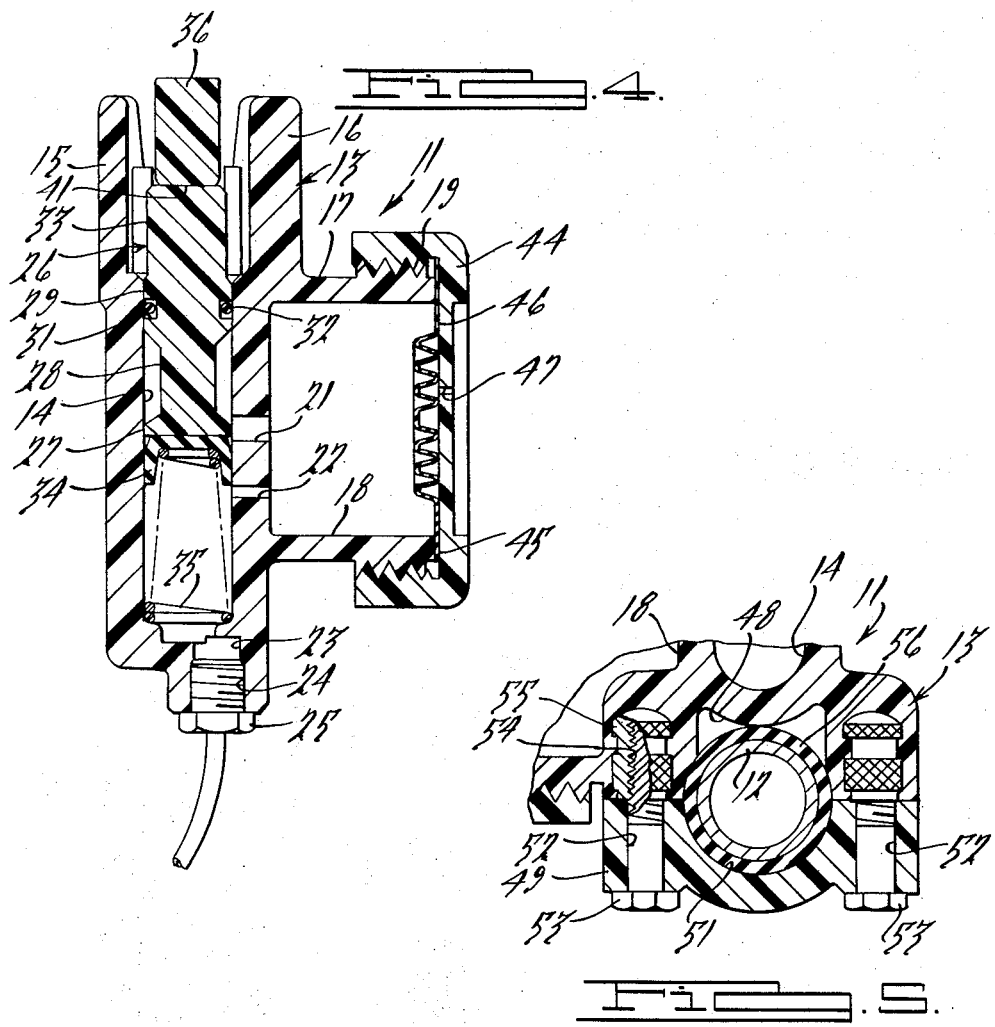

3,802,200

PLASTIC MASTER CYLINDER

BACKGROUND OF THE INVENTION

This invention relates to a corrosion resistant master cylinder for a brake system and more particularly to a plastic, lever operated master cylinder for a motorcycle, bicycle or like vehicle.

Recently it has been proposed to embody hydraulically actuated brakes for vehicles such as motorcycles or the like in place of the previously used mechanical actuated braking systems. Such vehicles experience high shock loadings and have their running components exposed to the elements in use. These factors along with the disadvantages as to cost and weight of conventional metallic master cylinder assemblies has limited the application of hydraulic brakes to this type of vehicle.

It is, therefore, a principle object of this invention to provide an improved corrosion resistant master cylinder assembly.

It is another object of this invention to provide a simplified low cost plastic master cylinder assembly that is lever actuated.

SUMMARY OF THE INVENTION

This invention is adapted to be embodied in a corrosion resistant master cylinder assembly for a brake system. The master cylinder includes a housing piece that is formed from a non-metallic, corrosion resistant material and which defines a bore. A piston is slidably supported within the bore and defines a fluid chamber with the bore. The housing defines a pressure outlet in communication with the chamber for receiving fluid pressurized by the movement of the piston within the bore.

BRIEF DESCRIPTION OF THE DRAWINGS

FIG. 1 is a top plan view of a portion of a vehicle embodying this invention.

FIG. 2 is an end elevational view of the master cylinder embodying the invention and is taken generally in the direction of the arrow 2 in FIG. 1.

FIG. 3 is a cross sectional view taken along the line 3—3 of FIG. 2.

FIG. 4 is a cross sectional view taken along the line 4—4 of FIG. 2.

FIG. 5 is a cross sectional view taken along the line 5—5 of FIG. 1.

DETAILED DESCRIPTION OF THE PREFERRED EMBODIMENT

A master cylinder assembly embodying this invention is identified generally by the reference numeral 11. The master cylinder assembly is particularly adapted for use in conjunction with the hydraulic brake system of a vehicle such as a motorcycle or the like. The assembly 11 is particularly adapted to be mounted on the vehicular handlebars 12, in a manner which will become more apparent as this description proceeds.

The master cylinder assembly 11 is comprised of a main housing piece, indicated generally by the reference numeral 13, which piece is formed from a molded plastic having relatively good dimensional stability, strength, low surface friction and resistance to chemicals and solvents, particularly hydraulic brake fluid. Acetal resins and specifically the material sold by Celanese Corporation of America under the trade name CELCON GC 25 have proven to be particularly successful for this application.

The housing piece 13 is molded to the desired finished shape and has very little machining, as will be noted. The housing 13 defines a cylindrical bore 14 that extends longitudinally through the piece 13. The bore 14 is blind at one end and at the other end terminates adjacent a pair of extending portions 15 and 16. A cylindrical projection 17 extends perpendicularly to the bore 14 and, in turn, defines a bore 18, which functions as a reservoir, as will become more apparent. The outer end of the projection 17 is formed with male threads, as at 19.

A pair of holes consisting of a large diameter hole 21 and a smaller diameter hole 22 are drilled from the bore 18 into the bore 14. In addition, a cored opening 23 intersects the inner end of the bore 14 and is tapped, as at 24 so as to receive a fitting 25.

A piston, indicated generally by the reference numeral 26, is slidably supported within the bore 14. The piston 26 is formed from an acetal resin such as the material sold by Celanese Corporation of America under the trade name CELCON M90-04. The piston is molded to shape and includes a land 27 that is formed at its inner end adjacent a reduced diameter portion 28. A second land 29 is formed on the other side of the reduced diameter portion 28 and is grooved circumferentially at 31 to receive a sealing O-ring 32. Adjacent the land 29, the piston 26 is formed with a somewhat similar diameter portion 33 that extends between the extensions 15 and 16 of the housing 13.

A cup 34 is interposed in the bore 14 at the head of the piston 26, adjacent the land 27. A coil spring 35 engages the cup 34 and the blind end of the bore 14 so as to urge the cup 34 and piston 26 to a retracted as shown in FIGS. 2 and 4.

An operating lever 36 is positioned between the housing portions 15 and 16. The operating lever 36 is also formed from an acetal resin, preferably from the same material from which the housing 13 is formed. The handle 36 has a bore 37 through which a pivot pin 38 extends. The pivot pin 38 also extends through aligned bores in the housing portions 15 and 16 and is held axially in place by snap rings 39. Thus, the handle 36 is pivotable relative to the housing 13.

The handle 36 has a toe portion 41 that engages the end of the piston portion 33. The spring 35 normally urges a face 42 of the handle 36 into abutment with a shoulder 43 of the housing 13. This is the released position of the brakes. It should be noted that the piston 26, cup 34 and spring 35 are retained within the bore 14 by the handle 36 and specifically by the pivotal support for the handle. That is, the piston 26, cup 34 and spring 35 may be removed by withdrawing the pin 38 and removing the handle 36. The chamber defined by the piston 26 and specifically the cup 34 and the bore 14 is maintained filled with hydraulic fluid from the reservoir defined by the cavity 18. The chamber is filled through the passage 22, which passage is closed off as the piston 26 commences its actuating stroke. The reservoir is closed by a cap 44 that has a female threaded portion 45 which is turned on to the threads 19. A Bellows type gasket 46 is interposed between the upper end of the reservoir and the cap 44. The cap 44 is formed with a vent opening 47.

Beneath the cylinder bore 14, the housing 13 is formed with a saddle shaped portion 48 through which the handlebar 12 extends with a clearance. A clamp member 49 has an arcuate recess 51 that embraces the other portion of the handlebar 12. The clamp member 49 is formed with a pair of openings 52 that pass bolts 53. The bolts 53 are threaded into threaded openings 54 of metallic inserts 55 that are molded into the housing 13 to hold the clamp 49 to the housing 13. An elastomer sleeve 56 encircles the portion of the handlebar 12 that is contained within the clamp 49 and housing saddle 48 so as to afford a resilient shock mounting for the master cylinder assembly 11.

From the foregoing description, it should be readily clear that a simplified low cost master cylinder assembly incorporating an integral reservoir is provided. Besides being durable and of a low cost, the assembly is able to withstand the extreme shock loadings encountered with the type of vehicle application which it is designed for.

It is to be understood that the foregoing description is that of a preferred embodiment of the invention. Various changes and modifications may be made without departing from the spirit and scope of the invention as defined by the appended claims.

I claim:

1. A master cylinder for a brake system or the like comprising a housing defining a bore opening through one end thereof, a piston slidably supported within said bore and defining a fluid chamber therewith, said piston having a portion adapted to protrude from the open end of said bore, said housing defining a pressure outlet in communication with said chamber for receiving fluid pressurized by the movement of said piston within said bore, an operating lever, means carried by said housing adjacent the open end of said bore for supporting said lever for pivotal movement about an axis transversely disposed relative to said bore and offset therefrom, said lever having a portion engaged with said piston for reciprocating said piston, and said lever and said housing each having integral cooperating parts adapted to abut to form a stop which forms the sole means for retaining said piston within said bore.

2. A master cylinder as set forth in claim 1 further including a reservoir integrally connected to the housing and in fluid communication with said bore.

3. A master cylinder as set forth in claim 2 wherein the housing defines a bifurcated portion adjacent the open end of the bore, said operating lever being pivotally supported by said bifurcated portion and extending therebetween.

4. A master cylinder as set forth in claim 1 further including a clamp piece detachably affixed to the housing, said clamp piece and said housing defining a cavity adapted to pass a handlebar or the like of an associated vehicle with a clearance, and resilient bushing interposed between said cavity and the handlebar for shock mounting the master cylinder thereupon.

5. A master cylinder as set forth in claim 1 wherein the housing defines a bifurcated portion adjacent the open end of the bore, said operating lever being pivotally supported by said bifurcated portion and extending therebetween.

6. A master cylinder as set forth in claim 1 wherein the housing is formed from a non-metallic corrosive resistant material.

* * * * *